Dec. 6, 1949          A. U. MACIA          2,490,312
SHARPENING AND GRINDING MACHINE
Filed March 28, 1947          3 Sheets-Sheet 1
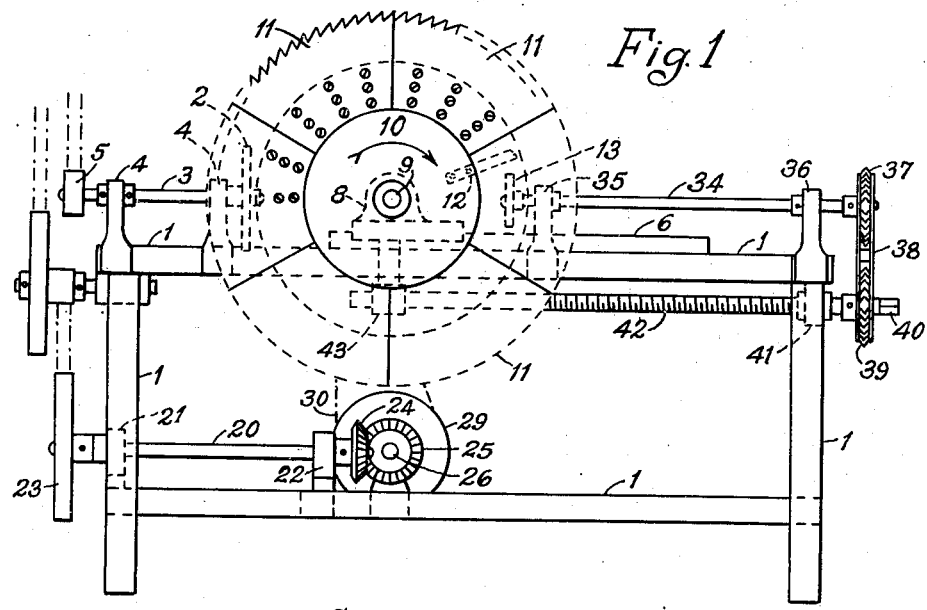
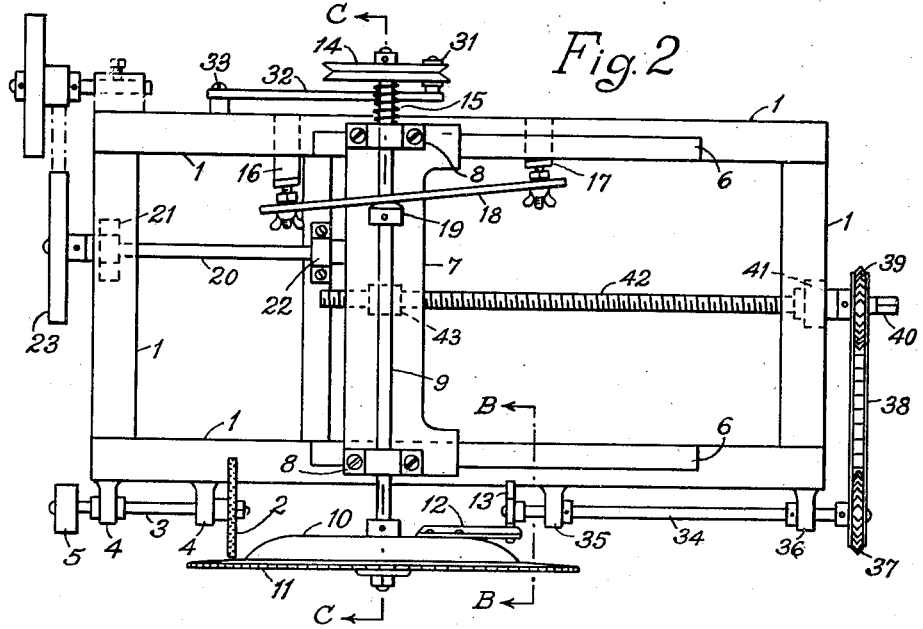
INVENTOR.
ANGEL U. MACIA
BY
ATTORNEY.

Dec. 6, 1949     A. U. MACIA     2,490,312
SHARPENING AND GRINDING MACHINE
Filed March 28, 1947     3 Sheets-Sheet 2

INVENTOR.
ANGEL U. MACIA
ATTORNEY.

Dec. 6, 1949  A. U. MACIA  2,490,312
SHARPENING AND GRINDING MACHINE
Filed March 28, 1947  3 Sheets-Sheet 3
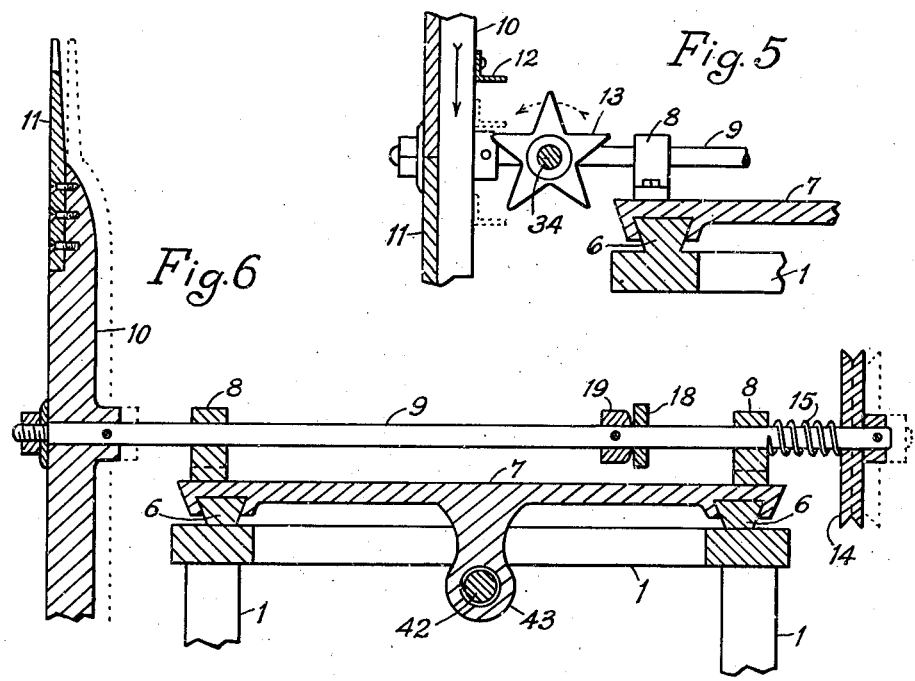
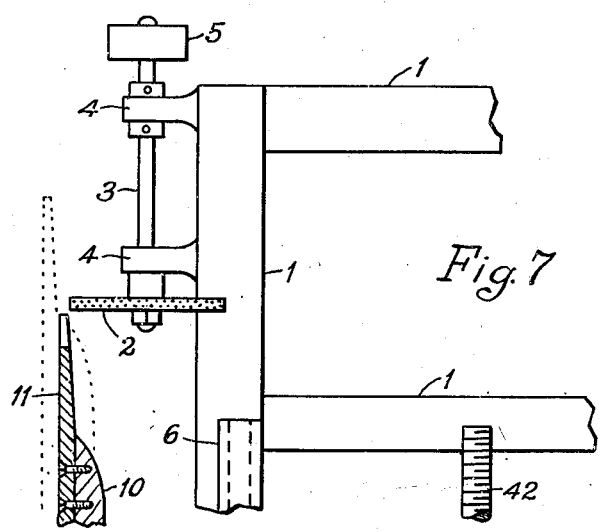
INVENTOR.
ANGEL U. MACIA
BY
ATTORNEY.

Patented Dec. 6, 1949

2,490,312

UNITED STATES PATENT OFFICE 2,490,312

SHARPENING AND GRINDING MACHINE

Angel Utset Maciá, Manzanillo, Cuba

Application March 28, 1947, Serial No. 737,900

3 Claims. (Cl. 51—95)

This invention is directed to a machine for grinding and sharpening all types of circular saws and cutters and more particularly concerned with grinding and sharpening the segments composing the circular saws used in the sawing of thin boards in the making of boxes and the like.

Conventionally, the grinding and sharpening of the saws and saw segments have been carried out by hand, ordinarily by the operator holding the saw or segment against the grinding wheel by hand, as the grinding and sharpening must have a certain regularity and uniformity in order to produce a proper treatment. It is a matter of physical impossibility for the operator to hold the article by hand against the grinding wheel to secure this uniformity and regularity, and hence grinding or sharpening by hand is rarely productive of a uniform or regular grinding and sharpening of the article.

The primary object of the present invention is a machine in which hand operation in the grinding or sharpening is entirely eliminated and in which the angle of the cut, the pressure, and speed at which the work engages the surface of the grinding wheel, are automatically maintained constant during the entire operation, whereby the segments or saws are uniformly and exactly treated in a minimum of time to insure perfect usable segments or saws at a materially limited cost of operation as compared with the hand operation, in addition to the avoidance of irregularity in the segment or saw incident to the machine operation as would cause such saw or segment to be practically useless from the irregularity of operation produced in the hand treatment.

The invention is illustrated in the accompanying drawings in which:

Figure 1 is a side elevation of the machine;

Figure 2 is a plan view of the same;

Figure 5 is a broken section on an enlarged scale taken on the line B—B of Figure 2;

Figure 6 is a transverse section on the line C—C of Figure 2; and

Figure 7 is a view in section partly in elevation showing the relative position of the segments or circular saws and the grinding wheel, the relative movement of the segments or saws while being ground being illustrated in part by dotted lines.

Figure 3:
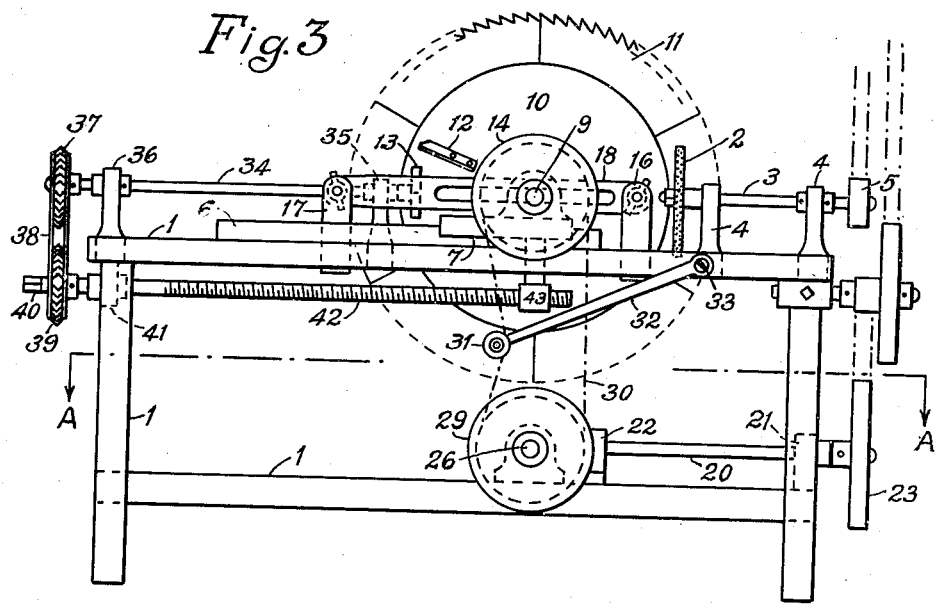
Figure 3 is a rear elevation of the machine.
Figure 4:
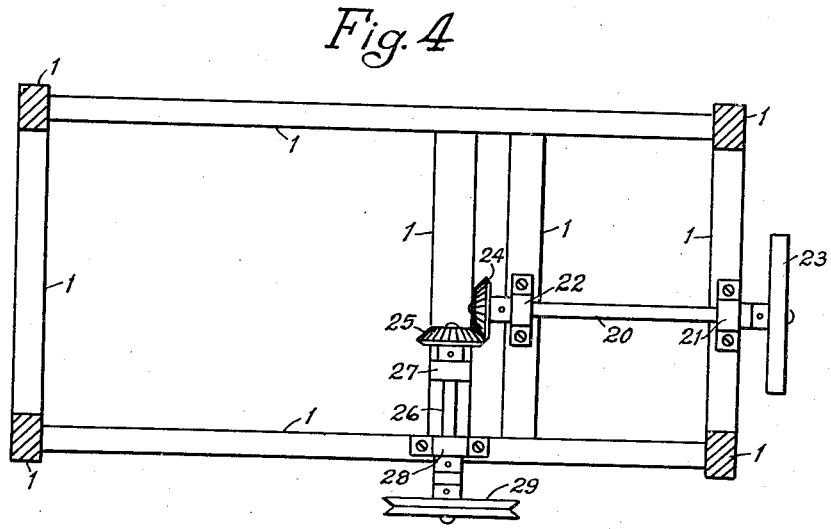
Figure 4 is a horizontal section on the line A—A of Figure 3.

The invention comprises a base or support in the form of a leg or other supported main frame of skeleton form including side bars and end bars, all such frame parts being indicated at 1.

An appropriate grinding wheel 2 is mounted upon one end of a shaft 3 mounted in bearings 4 secured near one end of the side frame bar, the shaft having a pulley 5 to be connected to any suitable source of power for operation of the grinding wheel.

Mounted on the upper surfaces of the side bars of the frame are longitudinal guides 6 to slidably support and guidingly receive a cross bar 7 terminally formed with guideways to cooperate with the guides 6. The bar 7 extends across the frame 1 from one side bar to the other and is substantially horizontal with respect to the machine and is centrally provided with a depending projection 43 for moving the bar 7 longitudinally of the guides 6, as will later appear.

As shown more particularly in Figures 5 and 6, the upper surface of the cross bar 7 is provided near its ends with fixed bearing guides 8 in which the main shaft 9 is rotatably supported. On that end of the shaft 9 adjacent the position of the grinding wheel and laterally spaced from frame 1, is secured a carrier plate 10 reduced on the relatively outer face near the peripheral edge to receive the segments or saw 11 to be ground.

Mounted upon that side bar of the main frame carrying the grinding wheel, is a shaft 34 supported in bearings 35 carried by the frame and provided at the end next the carrier plate 10 with a star wheel 13. The star wheel is arranged in the path of movement of a trip 12 carried by the plate 10, which plate incident to each complete revolution of the carrier plate 10 engages a projection of the star wheel 13 and moves such star wheel and thereby the shaft 34 through a definite distance.

The projection 43 depending from the cross bar 7 has a threaded opening to receive a cooperating threaded shaft 42, which shaft is mounted in one end of the frame and carries a sprocket 39 beyond the frame. The sprocket 39 is connected by a chain 38 with the sprockets 37 secured upon the end of shaft 34 carrying the star wheel so that as the star wheel is turned the threaded shaft 42 is also turned and the cross bar 7 is advanced longitudinally of the frame to correspondingly advance the carrier plate 10.

The end of the main shaft 9 which carries the carrier plate 10 is provided on the opposite end with a belt wheel 14 and between the frame and the wheel 14 the shaft is provided with a spring 15 tending when free, to act to move the shaft 9 transverse the frame in a direction to draw the carrier plate 10 toward the frame.

It being necessary to adjust the segment or saw carrier plate 10 toward the grinding wheel in order that the wheel in operation may grind the segment 11 on a slanting cut, means must be provided for moving the carrier 10 toward the frame and this movement while capable of adjustment, must be uniform and constant during the grinding operation. To provide for this result, clips 16 and 17 of different lengths are secured to one of the side bars of the frame 1, adjacent the pulley 14. These clips while of any conventional form, are preferably designed to receive a bar 18 which by reason of the clip 16 being arranged at a greater distance from the side bar of the frame than the clip 17, the bar 18 inclines longitudinally of the frame, as clearly shown in Figure 2. A cooperating stop 19 is fixed upon the shaft 9 and is designed to contact with the guide bar 18 during the sawing operation.

In order that the wheel 14 may be held under a constant tension in operation, shaft 20 is mounted in the frame in bearing supports 21 and 22 and terminates within the frame in a bevel gear 24. The opposite end of the shaft 20 is provide with a belt wheel 23 designed, as illustrated in Figure 3, to be connected to a source of power. The bevel gear 24 cooperates with the bevel gear 25 mounted upon a shaft 26 supported in bearings 27 and 28 and provided beyond the frame 1 with a belt pulley 29, the parts being arranged so that the belt wheel 29 is in vertical alignment with the belt wheel 14. A belt 30 connects the belt wheels 14 and 29 so that movement of the shaft 20 compels operation of the belt 30 and rotation of the belt wheel 14. In order that the movement of the belt wheel 14 be constant and uniform during the operation of the machine, a tension roller 31, supported upon an arm 32 pivotally mounted in the frame at 33 engages the belt 30 to insure a proper tension with respect to the operation of the wheel 14.

The operation of the machine is comparatively simple. After the segment of circular saw 11 to be treated is or are firmly clamped to the outer faces of the carrier plate 10, the latter is brought into position so that the grinding wheel 2 contacts segment 11 at the extreme interior point of the area to be ground. The grinding wheel grinds that area while the carrier plate 10 is slowly revolving to a point where the trip 12 on the rear face of the plate 10 engages and turns star wheel 13, compelling a predetermined part of a revolution which is transmitted to endless shaft 42 to move cross bar 7 a distance from the edge of the grinding wheel 2.

This movement which of course includes that of the carrier plate causes an additional part of the area of the segment 11 to be subjected to the action of the grinding wheel while at the same time the spring 15 causes the shaft 9 to move the carrier plate 10 and segment 11 into grinding contact with the wheel 2. This cycle of movement is repeated each time that the carrier plate 10 makes a complete revolution. The inclined guide bar 18 which is set at an angle to the length of the frame tends to control the amount that the saw segment 11 is moved inwardly against the edge of the grinding wheel 2. Of course the greater the angle of the bar 18, the greater the distance stop 19 will have to move to keep its contact with such guide bar and as stop 19 is firmly fixed on shaft 9, the spring draws such axle and connected parts as described. This specific operation combined with the lengthwise movement of cross bar 7 permits the removal of a slanting cut or grind on segment 11.

I claim:

1. A grinding and sharpening machine for saws and saw segments, including a base, a power driven grinding wheel mounted on said base, a main shaft mounted transversely on the base and perpendicular to the axis of the grinding wheel, a cross bar on which the main shaft is mounted, said cross bar being movably mounted on the base and having a projection depending from its lower face, a plate for receiving the article to be ground on one end of the main shaft adjacent the grinding wheel, a pulley on the opposite end of the main shaft, a spring on the main shaft between the base and pulley, a stop secured on the main shaft, a bar on the base to be engaged by the stop for defining movement of the plate, means on the base to support the bar at an adjustable incline to compel a corresponding movement of the plate when the stop is in contact with the bar, an intermittent drive shaft mounted on the base, a star wheel on one end of such intermittent drive shaft, a sprocket wheel on the opposite end of such shaft, a trip on the plate to engage and turn the star wheel a predetermined distance at each complete revolution of the plate, the operation of the star wheel compelling corresponding movement of the sprocket on the intermittent drive shaft, a shaft mounted in the frame and having threaded connection with the projection depending from the cross bar, a sprocket carried by the end of the threaded shaft and operatively connected to the sprocket on the intermittent drive shaft to compel limited movement of the cross bar during movement of the star wheel for moving the plate and article carried thereby with relation to the grinding wheel, two intersecting axles having terminal cooperating gears, a power driven pulley on one end of one of such axles, a pulley on the end of the other axle, and a driving connection between such last-named pulley and the pulley on the main shaft, the threaded shaft being terminally formed for hand operation at will.

2. A grinding and sharpening machine for saws and saw segments, including a supporting frame, a cross bar mounted for longitudinally guided movement on the frame, a main shaft mounted on the cross bar for movement longitudinally of the main shaft, a saw carrier plate mounted on the shaft, a grinding wheel mounted on the frame for cooperation with the saw or saw segment mounted on the carrier plate, means for moving the cross bar and connected parts longitudinally of the frame following a predetermined operation of the grinding means, a belt wheel fixed to the end of the main shaft opposite the carrier plate for rotating the main shaft and carrier plate; means carried by the frame for rotative connection with the belt wheel to drive the latter and thereby the carrier plate, a guide bar carried by the frame, means for supporting the guide bar longitudinally of the frame at an inclination to the side bars of the frame and means on the shaft to cooperate with the guide bar to define the approach of the carrier plate toward the grinding wheel during progressive movement of the crossbar longitudinally of the frame.

3. A grinding and sharpening machine for saws and saw segments, including a supporting frame, a cross bar mounted for longitudinally guided movement on the frame, a main shaft mounted on the cross bar for movement longitudinally of the main shaft, a saw carrier plate mounted on the shaft, a grinding wheel mounted on the frame for cooperation with the saw or saw segment mounted on the carrier plate, means for moving the crossbar and connected parts longitudinally of the frame following a predetermined operation of the grinding means, a belt wheel fixed to the end of the main shaft opposite the carrier plate for rotating the main shaft and carrier plate, means carried by the frame for rotative connection with the belt wheel to drive the latter and thereby the carrier plate, a guide bar carried by the frame, means for supporting the guide bar longitudinally of the frame at an inclination to the side bars of the frame, means on the shaft to cooperate with the guide bar to define the approach of the carrier plate toward the grinding wheel during progressive movement of the crossbar longitudinally of the frame, and means for mounting the guide bar at various inclinations to the side bars of the frame at will.

ANGEL UTSET MACIÁ.

REFERENCES CITED

The following references are of record in the file of this patent:

UNITED STATES PATENTS

| Number | Name | Date |
|---|---|---|
| 29,950 | Burger | Sept. 11, 1860 |
| 256,440 | Medart | Apr. 11, 1882 |
| 379,108 | Hall | Mar. 6, 1888 |
| 731,230 | Schrader | June 16, 1903 |
| 794,159 | Brening | July 11, 1905 |
| 799,700 | Youngstrom | Sept. 19, 1905 |
| 1,084,500 | Stewart | Jan. 13, 1914 |
| 1,186,616 | Strecker | June 13, 1916 |
| 1,286,032 | Laisne | Nov. 26, 1918 |
| 1,688,068 | Beyer | Oct. 16, 1928 |